(12) United States Patent
Chen et al.

(10) Patent No.: US 7,956,792 B2
(45) Date of Patent: Jun. 7, 2011

(54) REMOTE CONTROLLER, ELECTRONIC PRODUCT SYSTEM, AND RELATED METHOD WITH MEMORY CAPABILITY

(75) Inventors: Shu-Yi Chen, Taipei (TW);
Chang-Hung Lee, Yu-Lin Hsien (TW)

(73) Assignee: Qisda Corporation, Taoyuan County (TW)

( * ) Notice: Subject to any disclaimer, the term of this patent is extended or adjusted under 35 U.S.C. 154(b) by 957 days.

(21) Appl. No.: 11/843,650

(22) Filed: Aug. 23, 2007

(65) Prior Publication Data

US 2008/0055146 A1 Mar. 6, 2008

(30) Foreign Application Priority Data

Aug. 31, 2006 (TW) ................................ 95132217 A

(51) Int. Cl.
*H04L 17/02* (2006.01)
(52) U.S. Cl. .................. 341/176; 340/13.25; 340/13.24; 348/734
(58) Field of Classification Search .................. 340/734, 340/825.69, 825.72; 348/734; 34/174
See application file for complete search history.

(56) References Cited

U.S. PATENT DOCUMENTS

| | | | | |
|---|---|---|---|---|
| 6,784,805 | B2 * | 8/2004 | Harris et al. | 340/825.69 |
| 6,791,467 | B1 * | 9/2004 | Ben-Ze'ev | 340/825.69 |
| 6,812,881 | B1 * | 11/2004 | Mullaly et al. | 341/176 |
| 7,589,642 | B1 * | 9/2009 | Mui | 340/825.69 |
| 2002/0097165 | A1 * | 7/2002 | Hulme | 340/825.72 |
| 2007/0080823 | A1 * | 4/2007 | Fu et al. | 340/825.22 |

FOREIGN PATENT DOCUMENTS

| TW | 200501662 | 1/2005 |
|---|---|---|
| TW | 200601720 | 1/2006 |

* cited by examiner

*Primary Examiner* — Benjamin C Lee
*Assistant Examiner* — Majid M Karamzadeh

(57) ABSTRACT

A remote controller with memory capability includes a status button, a memory, a processing unit, and a transceiver device. The memory is utilized for storing a status information of an electronic product. When the status button is pressed, the processing unit generates a control signal and determines whether the status information exists in the memory. When the status button is pressed and the status information does not exist in the memory, the transceiver device outputs the control signal and receives the status information and the memory stores the status information. When the status button is pressed and the status information exists in the memory, the transceiver device outputs the control signal and the status information stored in the memory.

18 Claims, 5 Drawing Sheets

REMOTE CONTROLLER, ELECTRONIC PRODUCT SYSTEM, AND RELATED METHOD WITH MEMORY CAPABILITY

BACKGROUND OF THE INVENTION

1. Field of the Invention

The present invention relates to a remote controller with memory capability, and more particularly, to a remote controller for storing the final status information in the memory when outputting a control signal to turn off an electronic product.

2. Description of the Prior Art

With the development of technology, the functionality of multimedia player devices increase day by day. Take televisions as example, not only numerous channels and shows can be selected but also other electronic devices such as DVD players or game players can be connected externally. Users can choose to watch different channels or switch to an external electronic device signal mode. Now it is popular that a family own at least two televisions. For this reason, users usually hope to operate several electronic products through one remote controller more conveniently.

Assume that users watch a channel CH1 on the first television TV1 in the living room at first, and then the users want to go back into the bedroom and hope to continue to watch the channel CH1. Thus, the users output the control signal to turn off the first television TV1 by utilizing the remote controller and go back into the bedroom to turn on the second television TV2. Conventionally, the users then need to set up the channel of the second television TV2 as the channel CH1.

Because the present day remote controller of the television remote control system does not have the function of storing the originally played channel CH1 in the memory of the remote controller, users need to turn on the second television TV2 and then set up the channel of the second television TV2 as the channel CH1 if they want to change to another place and to continue watching the channel CH1. This is quite inconvenient for users.

SUMMARY OF THE INVENTION

The claimed invention provides a remote controller with memory capability. The remote controller includes a status button, a memory, a processing unit, and a transceiver device. The memory is utilized for storing a status information of an electronic product. When the status button is pressed, the processing unit generates a control signal and determines whether the status information exists in the memory. When the status button is pressed, the transceiver device transmits the control signal and the status information. When the status button is pressed and the processing unit determines that the status information does not exist in the memory, the transceiver device outputs the control signal, receives the status information, and the memory stores the status information. When the status button is pressed and the processing unit determines that the status information exists in the memory, the transceiver device outputs the control signal and the status information that is stored in the memory.

The claimed invention provides an electronic product system capable of controlling memory capability with a remote controller. The electronic product system includes a first electronic product, a second electronic product, and a remote controller. The first electronic product includes a first transceiver device and a status information. The second electronic product includes a second transceiver device. The remote controller includes a status button, a memory, a processing unit, and a third transceiver device. The memory is utilized for storing the status information. When the status button is pressed, the processing unit generates a control signal and determines whether the status information exists in the memory. The third transceiver device is utilized for transmitting the control signal and the status information and exchanging data with the first transceiver device and the second transceiver device. When the status button is first pressed, the third transceiver device transmits the control signal to the first transceiver device, receives the status information, and stores the status information in the memory. When the status button is pressed again, the third transceiver device transmits the control signal and the status information to the second transceiver device.

The claimed invention provides a method for utilizing a remote controller to operate electronic products. The method includes determining whether a status information exists in a memory of a remote controller when a status button of the remote controller is pressed, the remote controller transmitting a control signal to a first electronic product if the status information does not exist in the memory of the remote controller, determining whether the first electronic product is on, the first electronic product transmitting the status information at present to the remote controller if the first electronic product is on and the status information does not exist in the memory of the remote controller, storing the status information in the memory of the remote controller, and turning off the first electronic product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
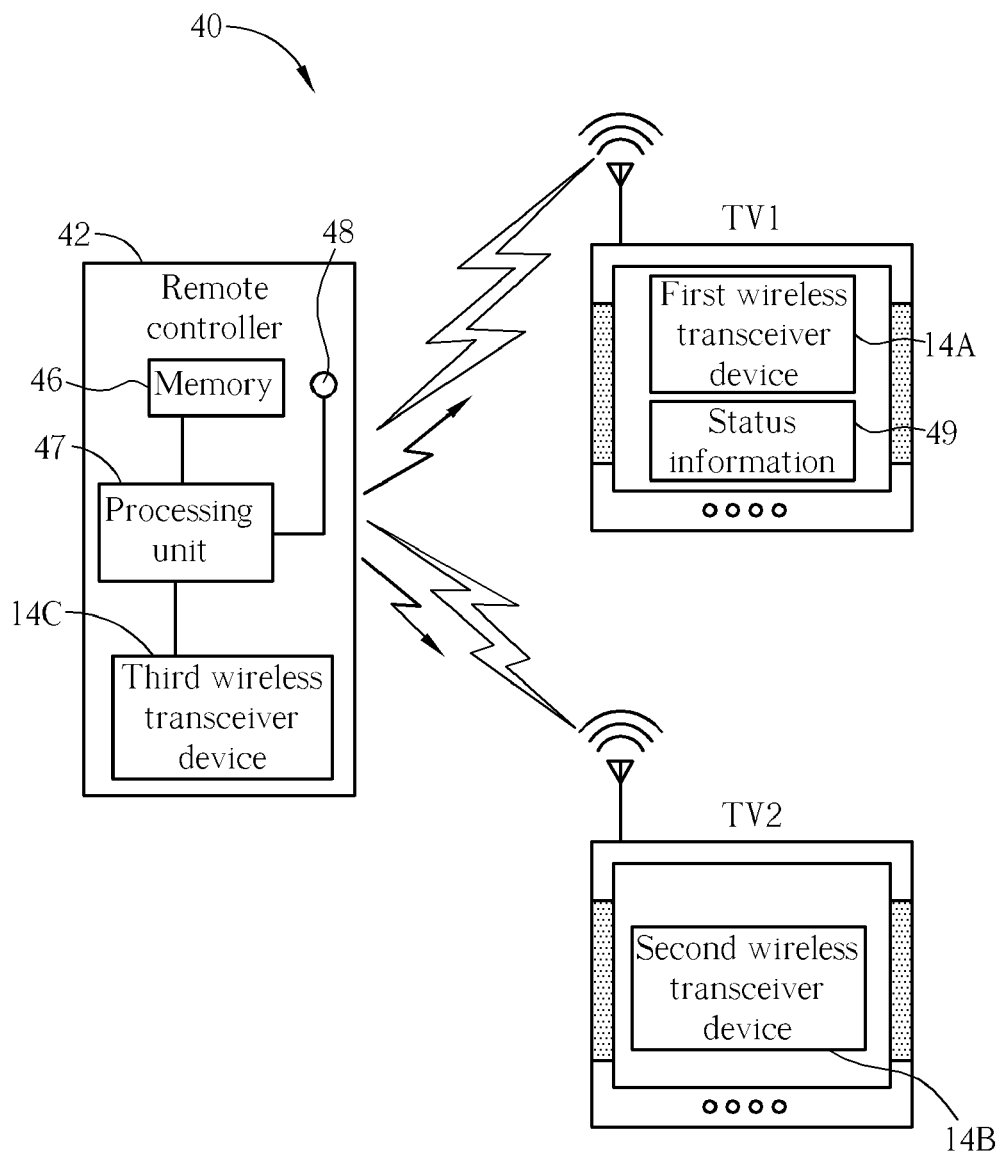
FIG. 1 is a television remote control system according to the present invention.

Please refer to FIG. 1. FIG. 1 is a television remote control system 40 according to the present invention. The television remote control system 40 includes a first television TV1, a second television TV2, and a remote controller 42. The first television TV1 includes a first wireless transceiver device 14A and a status information 49. The second television TV2 includes a second wireless transceiver device 14B. The remote controller 42 includes a third wireless transceiver device 14C, a memory 46, a processing unit 47, and a status button 48. The memory 46 is utilized for storing the status information 49. The processing unit 47 is coupled to the memory 46, the third wireless transceiver device 14C, and the status button 48. When the status button 48 is pressed, the processing unit 47 generates a control signal and determines whether the status information 49 exists in the memory 46.

The third wireless transceiver device 14C is utilized for exchanging data with the first wireless transceiver device 14A and the second wireless transceiver device 14B in a wireless manner, and for transmitting the control signal and the status information 49. The first television TV1 may be located in the living room and the second television TV2 may be located in the bedroom. The first wireless transceiver device 14A, the second wireless transceiver device 14B, and the third wireless transceiver device 14C are each an infrared ray (IR) transceiver device.

Figure 2:
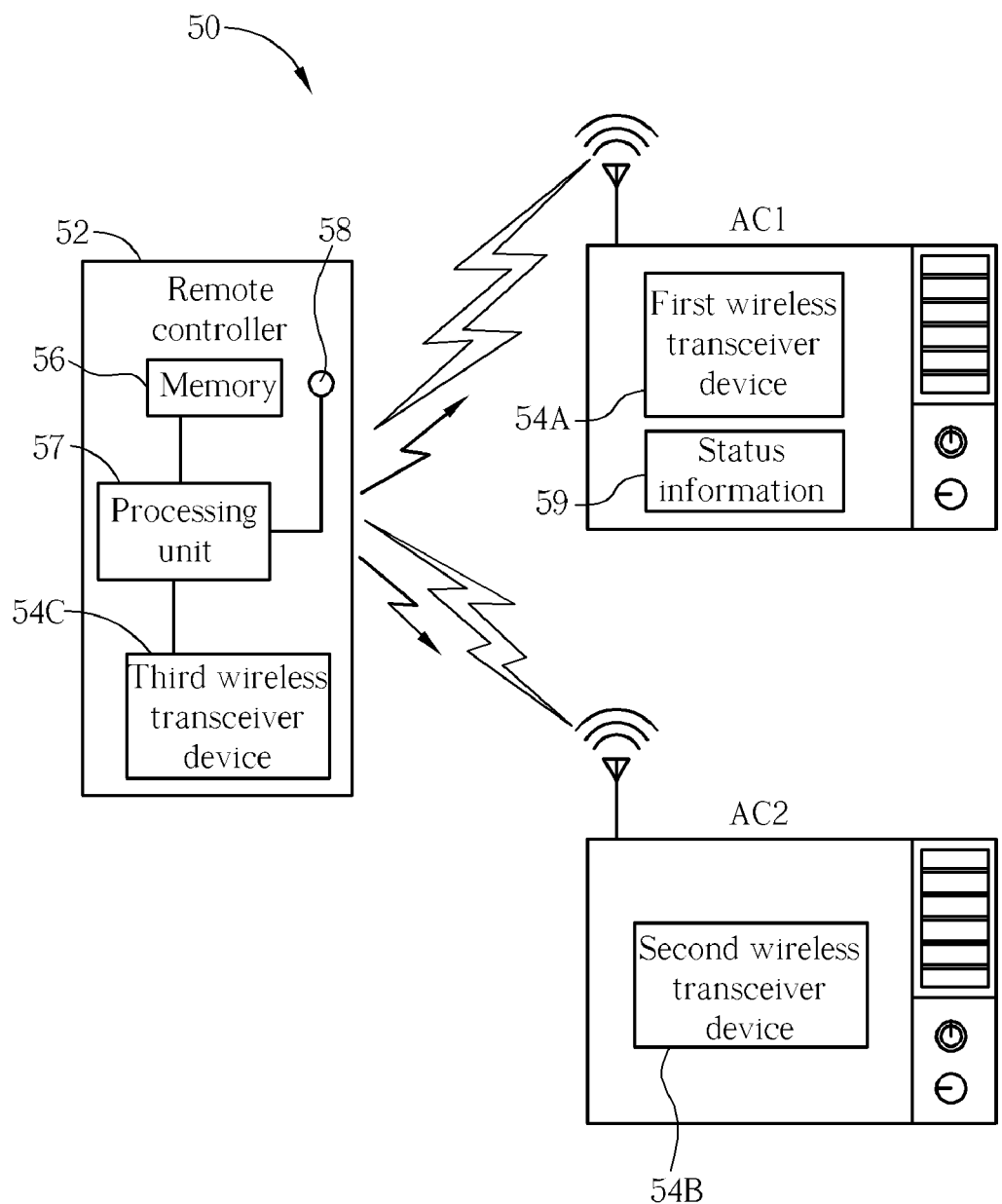
FIG. 2 is an air conditioner remote control system according to the present invention.

Please refer to FIG. 2 that is an air conditioner remote control system 50 according to the present invention. The air conditioner remote control system 50 includes a first air conditioner AC1, a second air conditioner AC2, and a remote controller 52. The first air conditioner AC1 includes a first wireless transceiver device 54A and a status information 59. The second air conditioner AC2 includes a second wireless transceiver device 54B. The remote controller 52 includes a third wireless transceiver device 54C, a memory 56, a processing unit 57, and a status button 58. The memory 56 is used for storing the status information 59. The processing unit 57 is coupled to the memory 56, the third wireless transceiver device 54C, and the status button 58. When the status button 58 is pressed, the processing unit 57 generates a control signal and determines whether the status information 59 exists in the memory 56. The third wireless transceiver device 54C is utilized for exchanging data with the first wireless transceiver device 54A and the second wireless transceiver device 54B in a wireless manner, and for transmitting the control signal and the status information 59. The first air conditioner AC1 may be located in the living room and the second air conditioner AC2 may be located in the bedroom. The first wireless transceiver device 54A, the second wireless transceiver device 54B, and the third wireless transceiver device 54C are each an infrared ray (IR) transceiver device.

Figure 3:
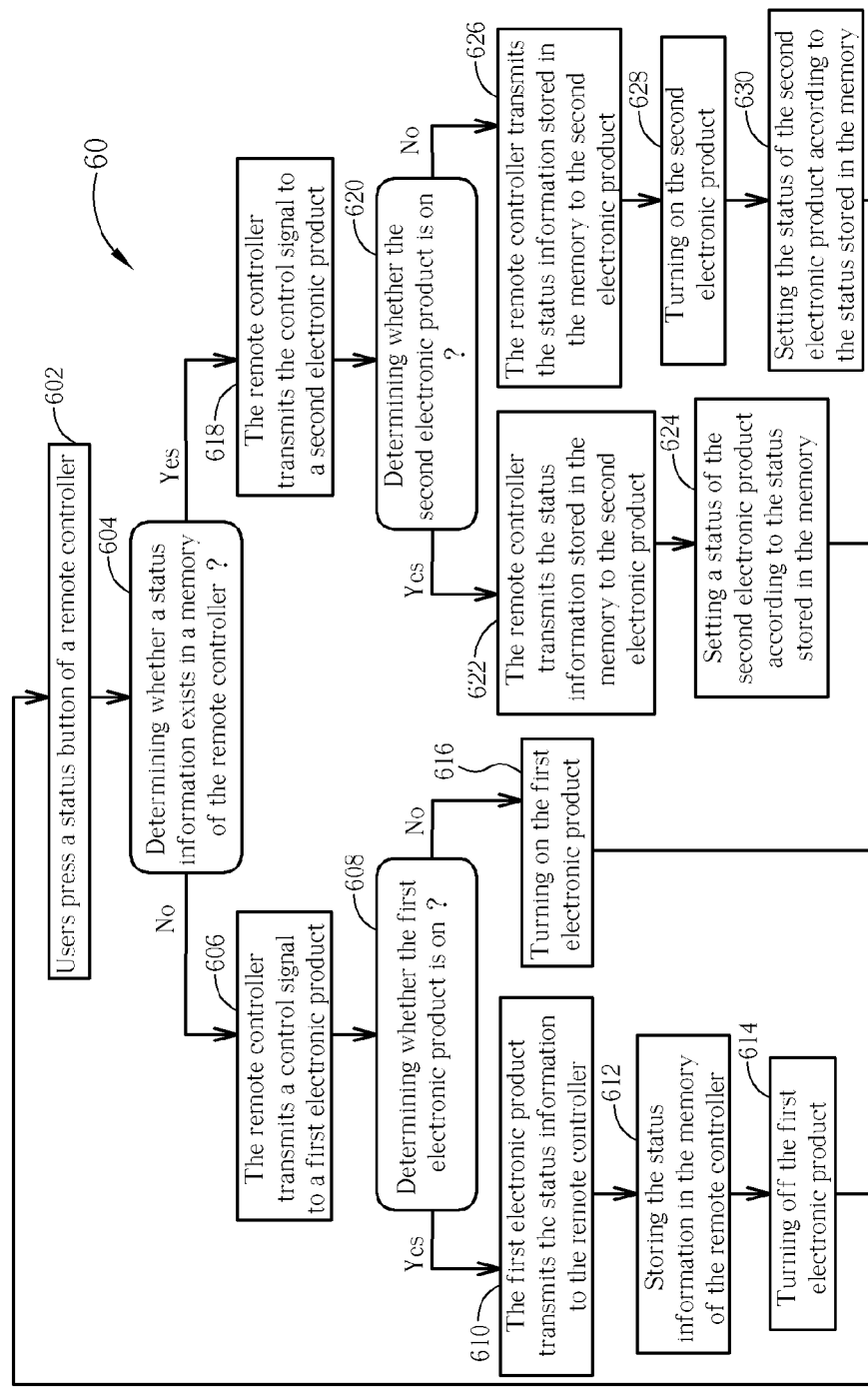
FIG. 3 is a diagram illustrating a flow of utilizing a remote controller to operate electronic products according to the present invention.

Please refer to FIG. 3 that is a diagram illustrating a flow 60 of utilizing a remote controller to operate electronic products according to the present invention. The flow 60 includes the following steps.

Step 602: Users press a status button of a remote controller.
Step 604: Determining whether a status information exists in a memory of the remote controller or not. If yes, go to step 618; otherwise, go to step 606.
Step 606: The remote controller transmits a control signal to a first electronic product.
Step 608: Determine whether the first electronic product is on or not. If yes, go to step 610; otherwise, go to step 616.
Step 610: The first electronic product transmits the status information to the remote controller.
Step 612: Store the status information in the memory of the remote controller.
Step 614: Turn off the first electronic product.
Step 616: Turn on the first electronic product.
Step 618: The remote controller transmits the control signal to a second electronic product.
Step 620: Determine whether the second electronic product is on or not. If yes, go to step 622; otherwise, go to step 626.
Step 622: The remote controller transmits the status information stored in the memory of the remote controller to the second electronic product.
Step 624: Set a status of the second electronic product according to the status stored in the memory of the remote controller.
Step 626: The remote controller transmits the status information stored in the memory of the remote controller to the second electronic product.
Step 628: Turn on the second electronic product.
Step 630: Set the status of the second electronic product according to the status stored in the memory of the remote controller.

Assume that users make use of the first electronic product in the living room at first, and then users want to go back to the bedroom and hope that the status of the second electronic product is kept the same as the status of the first electronic product. If the status information of the first electronic product did not exist in the memory of the remote controller at first, the control signal is transmitted to the first electronic product firstly when users press the status button. In step 612, the remote controller stores the status information of the first electronic product in the memory of the remote controller if the first electronic product is on. In step 614, the remote controller turns off the first electronic product. Then users go back to the bedroom and press the status button again. At this time the status information of the first electronic product exists in the memory of the remote controller. In step 620, whether the second electronic product is in on is determined. In step 622-624, the status information stored in the memory of the remote controller is transmitted to the second electronic product and the status of the second electronic product is set up according to the status stored in the memory of the remote controller if the second electronic product is on. In step 626-630, the second electronic product is turned on and the status of the second electronic product is set to the same status as the status of the first electronic product through the remote controller if the second electronic product is off.

Figure 4:
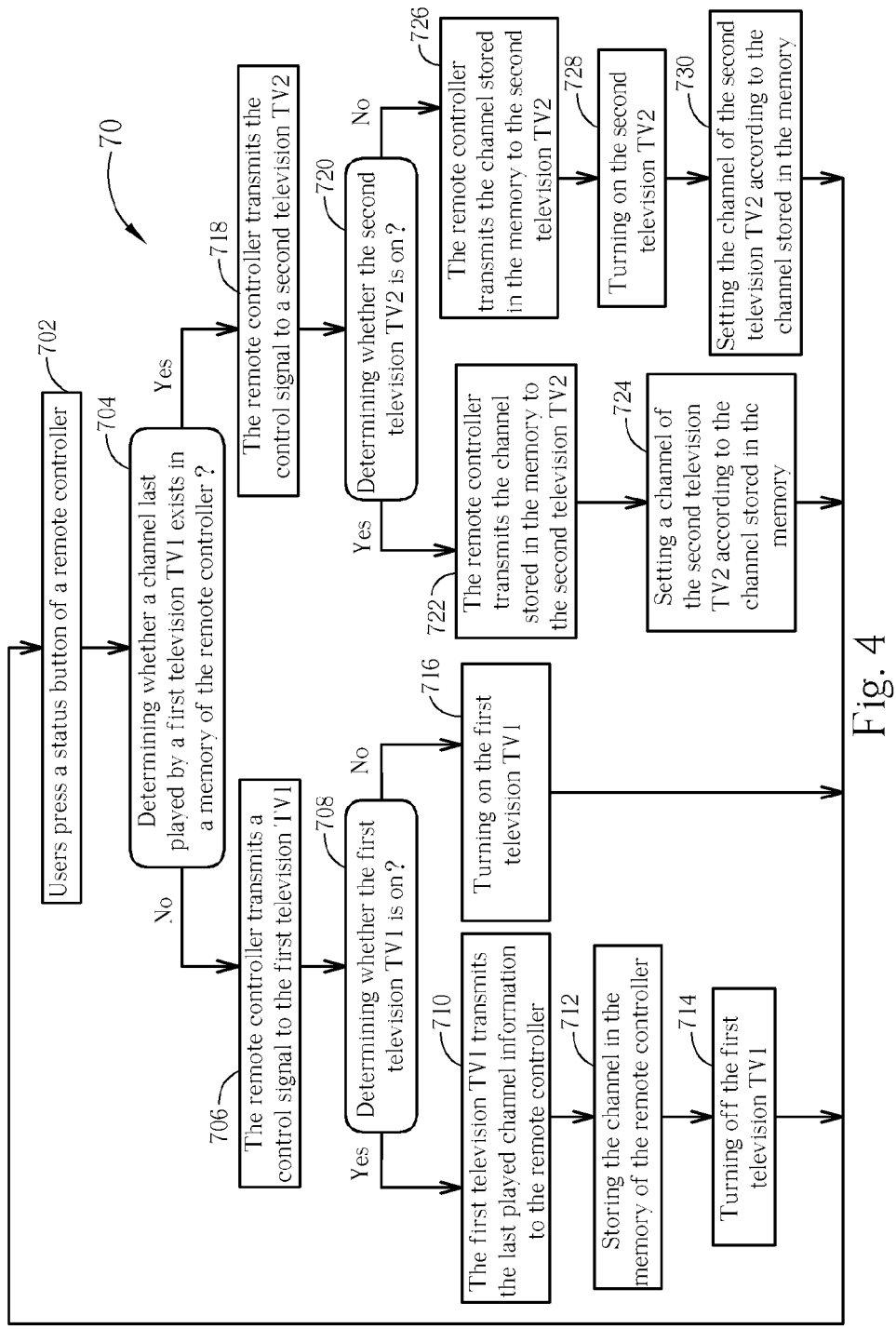
FIG. 4 is a diagram illustrating a flow of utilizing a remote controller to operate the television remote control system in FIG. 1.

Please refer to FIG. 4. FIG. 4 is a diagram illustrating a flow 70 of utilizing a remote controller to operate the television remote control system 40 in FIG. 1. The flow 70 includes the following steps.

Step 702: Users press a status button of a remote controller.
Step 704: Determine whether a channel last played by a first television TV1 exists in a memory of the remote controller or not. If yes, go to step 718; otherwise, go to step 706.
Step 706: The remote controller transmits a control signal to the first television TV1.
Step 708: Determine whether the first television TV1 is on or not. If yes, go to step 710; otherwise, go to step 716.
Step 710: The first television TV1 transmits the last played channel information to the remote controller.
Step 712: Store the channel in the memory of the remote controller.
Step 714: Turn off the first television TV1.
Step 716: Turn on the first television TV1.
Step 718: The remote controller transmits the control signal to a second television TV2.
Step 720: Determine whether the second television TV2 is on or not. If yes, go to step 722; otherwise, go to step 726.
Step 722: The remote controller transmits the channel stored in the memory of the remote controller to the second television TV2.
Step 724: Set a channel of the second television TV2 according to the channel stored in the memory of the remote controller.
Step 726: The remote controller transmits the channel stored in the memory of the remote controller to the second television TV2.
Step 728: Turn on the second television TV2.
Step 730: Set the channel of the second television TV2 according to the channel stored in the memory of the remote controller.

Assume that users watch a channel CH1 of the first television TV1 in the living room at first, and then the users want to go back to the bedroom and hope to continue to watch the channel CH1. The channel CH1 of the first television TV1 did not exist in the memory of the remote controller at first. Firstly when the users press the status button, the control signal is transmitted to the first television TV1. In step 712, the remote controller stores the channel of the first television TV1 in the memory of the remote controller if the first television TV1 is on. In step 714, the remote controller turns off the first television TV1. Then users go back to the bedroom and press the status button again. At this time the channel CH1 of the first television TV1 exists in the memory of the remote controller already. In step 720, whether the second television TV2 is on is determined. In step 722-724, the channel CH1 stored in the memory of the remote controller is transmitted to the second television TV2 and the channel of the second television TV2 is set up according to the channel CH1 stored in the memory of the remote controller if the second television TV2 is on. In step 726-730, the second television TV2 is turned on and the channel of the second television TV2 is set to the channel CH1 which is the same channel as the channel of the first television TV1 through the remote controller if the second television TV2 is off.

In the abovementioned embodiment, the first and the second electronic products are each a television, but this is only an example for illustrating the present invention and is not limited only to this. For example, in another embodiment, the first and the second electronic products can each be an air conditioner.

Figure 5:
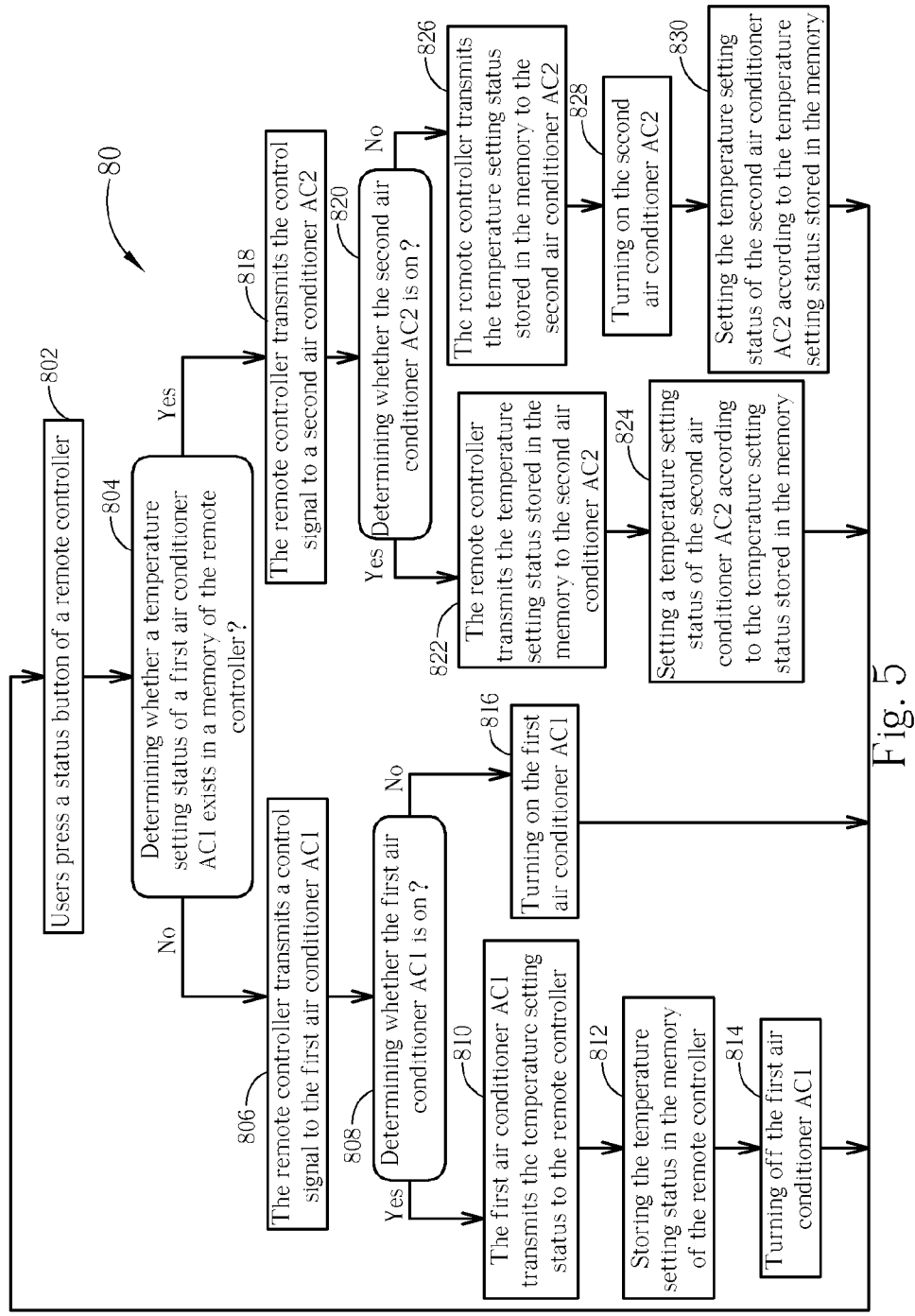
FIG. 5 is a diagram illustrating a flow of utilizing a remote controller to operate the air conditioner remote control system in FIG. 2.

Please refer to FIG. 5. FIG. 5 is a diagram illustrating a flow 80 of utilizing a remote controller to operate the air conditioner remote control system 50 in FIG. 2. The flow 80 includes the following steps.

Step 802: Users press a status button of a remote controller.

Step 804: Determine whether a temperature setting status of a first air conditioner AC1 exists in a memory of the remote controller or not. If yes, go to step 818; otherwise, go to step 806.

Step 806: The remote controller transmits a control signal to the first air conditioner AC1.

Step 808: Determine whether the first air conditioner AC1 is on or not. If yes, go to step 810; otherwise, go to step 816.

Step 810: The first air conditioner AC1 transmits the temperature setting status to the remote controller.

Step 812: Store the temperature setting status in the memory of the remote controller.

Step 814: Turn off the first air conditioner AC1.

Step 816: Turn on the first air conditioner AC1.

Step 818: The remote controller transmits the control signal to a second air conditioner AC2.

Step 820: Determine whether the second air conditioner AC2 is on or not. If yes, go to step 822; otherwise, go to step 826.

Step 822: The remote controller transmits the temperature setting status stored in the memory of the remote controller to the second air conditioner AC2.

Step 824: Set a temperature setting status of the second air conditioner AC2 according to the temperature setting status stored in the memory of the remote controller.

Step 826: The remote controller transmits the temperature setting status stored in the memory of the remote controller to the second air conditioner AC2.

Step 828: Turn on the second air conditioner AC2.

Step 830: Set the temperature setting status of the second air conditioner AC2 according to the temperature setting status stored in the memory of the remote controller.

The above-mentioned embodiments illustrate but do not limit the present invention. The mentioned first electronic product and the second electronic product controlled by the remote controller are used to illustrate but do not limit the present invention. The number of the electronic products is not limited to two but can be expanded to a plurality of electronic products. Furthermore, the present invention takes televisions and air conditioners as example but could be other electronic products. The first transceiver device 14A, the second transceiver device 14B, and the third transceiver device 14C could each be an infrared ray (IR) transceiver device or other wireless transceiver device.

In conclusion, the present invention provides a method for utilizing a remote controller with memory capacity to operate a plurality of electronic products. As for the television remote control system, users can continue watching the same channel everywhere at home through the remote controller 42 of the present invention, which reaches a so-called "AV follow me" to save time and increase convenience. Similarly, as for the air conditioner remote control system, users can enjoy the same comfort everywhere at home.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote controller with memory capability for controlling electronic products, comprising:
   a status button;
   a memory for storing a status information of a first electronic product;
   a processing unit for generating a control signal and determining whether the status information exists in the memory when the status button is pressed; and
   a transceiver device for transmitting and receiving;
   wherein when the status button is pressed and the processing unit determines that the status information does not exist in the memory, the transceiver device outputs the control signal to and receives the status information from the first electronic product, and the memory stores the status information;
   wherein when the status button is pressed and the processing unit determines that the status information exists in the memory, the transceiver device outputs the control signal and the status information stored in the memory to a second electronic product.

2. The remote controller of claim 1, wherein the transceiver device is a wireless transceiver device.

3. The remote controller of claim 2, wherein the transceiver device is an infrared ray (IR) transceiver device.

4. The remote controller of claim 1, wherein the electronic products are televisions.

5. The remote controller of claim 1, wherein the electronic products are air conditioners.

6. An electronic product system capable of controlling memory capability with a remote controller comprising:
   a first electronic product having a first transceiver device and status information;
   a second electronic product having a second transceiver device; and
   a remote controller, the remote controller comprising:
   a status button;
   a memory for storing the status information;
   a processing unit for generating a control signal and determining whether the status information exists in the memory when the status button is pressed; and a third transceiver device for transmitting the control signal and the status information, and exchanging data with the first transceiver device and the second transceiver device;

wherein when the status button is first pressed, the third transceiver device transmits the control signal to the first transceiver device, receives the status information as a response from the first electronic product, and stores the status information in the memory;

wherein when the status button is pressed again, the third transceiver device transmits the control signal and the status information to the second transceiver device for controlling the second electronic product.

7. The electronic product system of claim 6, wherein the first transceiver device, the second transceiver device, and the third transceiver device are each an infrared ray (IR) transceiver device.

8. The electronic product system of claim 6, wherein the first electronic product and the second electronic product are each a television.

9. The electronic product system of claim 6, wherein the first electronic product and the second electronic product are each an air conditioner.

10. A method for utilizing a remote controller to operate electronic products, comprising:
   determining whether status information of a first electronic product exists in a memory of a remote controller when a status button of the remote controller is pressed;
   the remote controller transmitting a control signal to the first electronic product if the status information does not exist in the memory of the remote controller;
   determining whether the first electronic product is on;
   the first electronic product transmitting the status information to the remote controller if the first electronic product is on and the status information does not exist in the memory of the remote controller;
   storing the status information in the memory of the remote controller;
   turning off the first electronic product;
   the remote controller transmitting a control signal to a second electronic product if the status information exists in the memory of the remote controller;
   determining whether the second electronic product is on; and
   setting a status of the second electronic product according to the status information stored in the memory of the remote controller if the second electronic product is on and the status information exists in the memory of the remote controller.

11. The method of claim 10 further comprising:
   turning on the first electronic product if the first electronic product is off and the status information does not exist in the memory of the remote controller.

12. The method of claim 10, wherein the step of the first electronic product transmitting the status information to the remote controller comprises a first television transmitting a last played channel information to the remote controller.

13. The method of claim 10, wherein the step of the first electronic product transmitting the status information to the remote controller comprises a first air conditioner transmitting a temperature setting status to the remote controller.

14. The method of claim 10 further comprising:
   turning on the second electronic product and setting the status of the second electronic product according to the status information stored in the memory of the remote controller if the second electronic product is off and the status information exists in the memory of the remote controller.

15. The method of claim 10, wherein the step of the remote controller transmitting the control signal and the status information stored in the memory of the remote controller to the second electronic product comprises the remote controller transmitting the control signal and a channel stored in the memory of the remote controller to a second television.

16. The method of claim 15, wherein the step of setting the status of the second electronic product according to the status information stored in the memory of the remote controller comprises the second television playing the channel.

17. The method of claim 10, wherein the step of the remote controller transmitting the control signal and the status information stored in the memory of the remote controller to the second electronic product comprises the remote controller transmitting the control signal and a temperature setting status stored in the memory of the remote controller to a second air conditioner.

18. The method of claim 17, wherein the step of setting the status of the second electronic product according to the status information stored in the memory of the remote controller comprises setting the temperature setting status as the temperature setting status stored in the memory of the remote controller.

* * * * *